United States Patent
Wagner et al.

(10) Patent No.: US 10,756,451 B2
(45) Date of Patent: Aug. 25, 2020

(54) CONNECTION ARRANGEMENT OF A FIRST COMPONENT ON A SECOND COMPONENT, IN PARTICULAR FOR A VEHICLE, AND CONNECTION DEVICE, IN PARTICULAR FOR A VEHICLE

(71) Applicant: Bayerische Motoren Werke Aktiengesellschaft, Munich (DE)

(72) Inventors: Matthias Wagner, Munich (DE); Philip Raettich, Munich (DE); Alexander Weyers, Aachen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/159,064

(22) Filed: Oct. 12, 2018

(65) Prior Publication Data
US 2019/0051994 A1 Feb. 14, 2019

Related U.S. Application Data

(63) Continuation of application No. PCT/EP2017/054585, filed on Feb. 28, 2017.

(30) Foreign Application Priority Data

Apr. 15, 2016 (DE) .................. 10 2016 206 378

(51) Int. Cl.
*H01R 4/30* (2006.01)
*H01R 4/34* (2006.01)
(Continued)

(52) U.S. Cl.
CPC ............. *H01R 4/34* (2013.01); *H01R 4/302* (2013.01); *F16B 13/06* (2013.01);
(Continued)

(58) Field of Classification Search
CPC .... H01R 13/6315; H01R 4/34; H01R 4/5025; F16B 41/002; F16B 37/061; F16B 37/048; F16B 5/10; F16B 37/041; B23P 19/062
(Continued)

(56) References Cited

U.S. PATENT DOCUMENTS

| 830,572 A | 9/1906 | Cutter | |
| 2,040,263 A * | 5/1936 | Layne | ..................... E21B 10/42 |
| | | | 175/421 |

(Continued)

FOREIGN PATENT DOCUMENTS

| CH | 518 456 A | 1/1972 |
| DE | 92 08 865 U1 | 12/1993 |

(Continued)

OTHER PUBLICATIONS

International Search Report (PCT/ISA/210) issued in PCT Application No. PCT/EP2017/054585 dated May 8, 2017 with English translation (four (4) pages).

(Continued)

*Primary Examiner* — Thanh Tam T Le
(74) *Attorney, Agent, or Firm* — Crowell & Moring LLP

(57) ABSTRACT

A connection arrangement of a first component on a second component, in particular for a vehicle, is provided, wherein the components are connected together by at least one screw element and at least one screw which is screwed into the screw element and passes through a first passage opening of the first component. The screw element is designed as an expansion sleeve which is partly received in a second opening of the second component and protrudes into the first component and which is expanded along the axial direction of the sleeve by screwing the screw into the expansion sleeve.

11 Claims, 1 Drawing Sheet

(51) Int. Cl.
*H01R 13/621* (2006.01)
*H01R 101/00* (2006.01)
*F16B 13/06* (2006.01)

(52) U.S. Cl.
CPC ...... *H01R 13/6215* (2013.01); *H01R 2101/00* (2013.01); *H01R 2201/26* (2013.01)

(58) Field of Classification Search
USPC ........ 439/247, 248, 801, 805, 809; 411/107, 411/171, 177, 181, 337, 352, 353, 970, 411/999
See application file for complete search history.

(56) References Cited

U.S. PATENT DOCUMENTS

| | | | | |
|---|---|---|---|---|
| 4,697,859 A * | 10/1987 | Fisher, Jr. | .......... | H01R 13/6315 439/246 |
| 4,850,903 A * | 7/1989 | Guillou | ..................... | H01P 1/04 439/784 |
| 4,952,107 A * | 8/1990 | Dupree | ................ | F16B 5/0208 411/103 |
| 5,516,303 A * | 5/1996 | Yohn | ................. | H01R 13/6315 439/248 |
| 5,641,294 A * | 6/1997 | Beard | .................. | H01R 13/746 439/247 |
| 5,980,178 A * | 11/1999 | Ono | ........................ | F16B 35/00 411/373 |
| 6,220,801 B1 * | 4/2001 | Lin | ........................ | F16B 31/02 411/278 |
| 6,224,421 B1 * | 5/2001 | Maturo, Jr. | ........ | H01R 13/6315 439/247 |
| 6,287,064 B1 * | 9/2001 | Jhumra | ................ | F16B 37/043 411/112 |
| 6,354,855 B2 * | 3/2002 | Annequin | .............. | H01R 13/74 439/248 |
| 6,468,012 B2 * | 10/2002 | Ellis | ...................... | F16B 41/002 411/107 |
| 6,769,850 B2 * | 8/2004 | Lay | .......................... | F16B 5/02 411/108 |
| 6,776,566 B2 * | 8/2004 | Kobusch | .............. | F16B 5/0283 411/432 |
| 6,860,693 B2 * | 3/2005 | Jones | .................... | F16B 5/0208 29/525.11 |
| 7,083,479 B2 * | 8/2006 | Muller | ..................... | H01R 4/64 439/801 |
| 7,458,837 B2 * | 12/2008 | Mineo | ................. | G01R 1/0416 324/756.05 |
| 7,588,449 B2 * | 9/2009 | Takehara | ........... | H01R 13/5219 439/247 |
| 8,192,116 B2 * | 6/2012 | Sturm | ................... | B23B 29/046 279/143 |
| 8,287,219 B2 * | 10/2012 | Opper | .................... | H01R 4/302 411/301 |
| 8,523,505 B2 * | 9/2013 | Opper | .................... | H01R 4/302 411/377 |
| 8,573,912 B2 * | 11/2013 | Dudzinsky | .............. | B23B 31/11 409/234 |
| 2008/0118325 A1 | 5/2008 | Opper et al. | | |

FOREIGN PATENT DOCUMENTS

| | | |
|---|---|---|
| DE | 699 06 591 T2 | 1/2004 |
| DE | 10 2014 203 128 A1 | 8/2015 |
| EP | 0 709 926 A1 | 5/1996 |
| EP | 1 923 957 A2 | 5/2008 |
| WO | WO 2005/100805 A1 | 10/2005 |

OTHER PUBLICATIONS

German-language Written Opinion (PCT/ISA/237) issued in PCT Application No. PCT/EP2017/054585 dated May 8, 2017 (six (6) pages).

German-language Search Report issued in counterpart German Application No. 10 2016 206 378.2 dated Mar. 16, 2017 with partial English translation (13 pages).

* cited by examiner

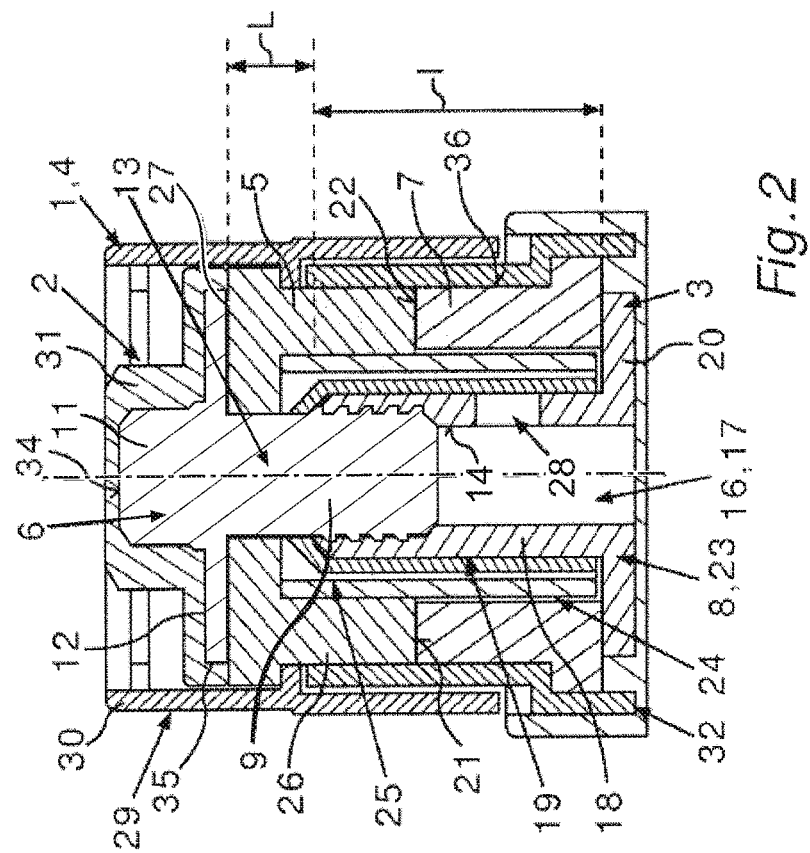
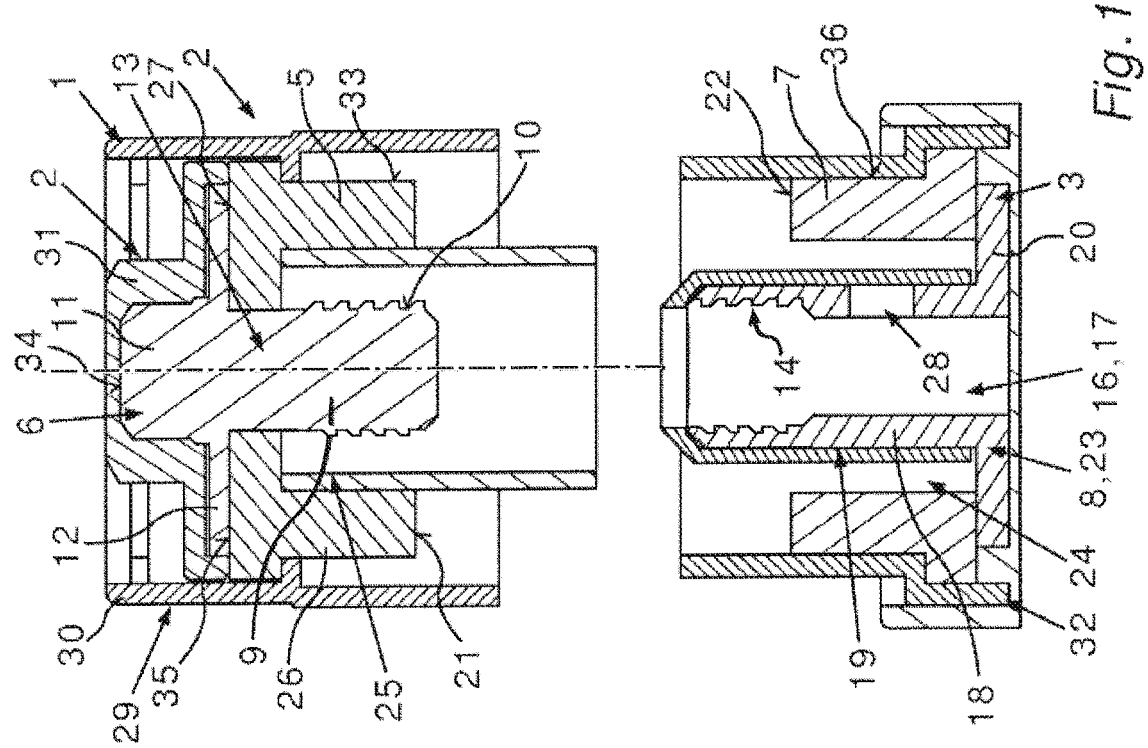

CONNECTION ARRANGEMENT OF A FIRST COMPONENT ON A SECOND COMPONENT, IN PARTICULAR FOR A VEHICLE, AND CONNECTION DEVICE, IN PARTICULAR FOR A VEHICLE

CROSS REFERENCE TO RELATED APPLICATIONS

This application is a continuation of PCT International Application No. PCT/EP2017/054585, filed Feb. 28, 2017, which claims priority under 35 U.S.C. § 119 from German Patent Application No. 10 2016 206 378.2, filed Apr. 15, 2016, the entire disclosures of which are herein expressly incorporated by reference.

BACKGROUND AND SUMMARY OF THE INVENTION

The invention relates to a connection arrangement of a first component on a second component, in particular for a vehicle, as well as to a connection device for the electrical connecting of two components, in particular for a vehicle.

Such a connection arrangement and such a connection device, especially for a vehicle, are already known for example from DE 10 2014 203 128 A1. In the connection arrangement, a first component is arranged on a second component, wherein the components are connected together, especially at least mechanically joined together, by way of at least one screw element and at least one screw which is screwed into the screw element and passes through a first passage opening of the first component.

The connection device is used to electrically join together two components, especially of a vehicle. In the context of the connection device, the first component is designed as a first electrical conductor and the second component as a second electrical conductor. The components or the electrical conductors are mechanically joined together by way of the screw element and by way of the screw, that is, they are held or fixed against each other. In the context of the connection arrangement, the electrical conductors are in electrical contact with each other. In other words, the electrical conductors are also electrically joined together, so that electric energy or electric current can be transmitted from one of the electrical conductors to the other of the electrical conductors and/or vice versa. In this way, electric current can be transmitted from one of the components across the electrical conductor to the other component.

The connection device is thus configured for example as a screwed current connector, by which the components can be easily electrically connected to each other, since the electrical conductors can be joined together especially easily and in particular in reversibly releasable manner.

The problem which the present invention proposes to solve is to modify a connection arrangement as well as a connection device of the kind mentioned above so that an especially firm and secure connection of the components as well as an especially small space requirement can be realized for the connection arrangement or the connection device.

This problem is solved according to the invention by a connection arrangement as well as by a connection device in accordance with embodiments of the invention.

A first aspect of the invention relates to a connection arrangement of a first component on a second component, in particular for a vehicle. The vehicle is for example a motor vehicle, especially a hybrid or electric vehicle. This means that the connection arrangement is suitable for use in a vehicle. However, the connection arrangement may also find use in stationary applications. The connection arrangement is especially advantageously suited to applications in which an antishock protection is advantageous or required, in order to make the likelihood of a person contacting current conducting components especially low or to prevent this. In particular, the connection arrangement is suitable for high-voltage applications having an electrical voltage, especially an electrical operating voltage, of more than 60 Volts, especially more than 100 Volts.

In the connection arrangement, the components are connected together by means of at least one screw element and at least one screw which is screwed into the screw element and passes through a first passage opening of the first component. The components here are mechanically joined together by the screw and by the screw element. In other words, the components are mechanically held against each other or fixed to each other by means of the screw and by means of the screw element, so that for example unwanted relative movements between the components can be avoided.

Now, in order to realize an especially firm and secure connection of the components as well as an especially small space requirement for the connection arrangement, it is provided according to the invention that the screw element is designed as an expansion sleeve, preferably a single-piece sleeve, which is partly received in a second opening of the second component and which protrudes into the first component, especially into the first passage opening, especially from the second opening. Moreover, the expansion sleeve is expanded along its axial direction by screwing the screw into the expansion sleeve. In other words, the expansion sleeve is expanded, especially elastically expanded along its axial direction by screwing the screw into the expansion sleeve.

Because the expansion sleeve according to the invention is not only received in the second opening, but also protrudes from the second opening into the first component, especially into the first passage opening, a length of the screw extending in the axial direction of the screw, especially a length of a shaft of the screw extending in the axial direction of the screw, can be kept especially small, so that the space requirement of the connection arrangement, especially in the axial direction of the screw, can be kept especially slight. Moreover, an especially firm and secure connection, especially a mechanical connection of the components can be realized, since an especially large length of the expansion sleeve can be realized, which extends in the axial direction of the expansion sleeve and is received in the components. In this way, an especially advantageous and particularly large expansion of the expansion sleeve can be realized, so that for example a short clamping length of the screw on account of the short length of the screw can be especially well compensated. Due to the use of the expandable or expanded expansion sleeve and the short screw, the dimensions and thus the space requirement of the connection arrangement can be kept especially small, while at the same time the advantageous properties of a standard screw fastening can be realized as regards a firm and secure connecting of the components.

In order to realize especially advantageous expansion properties of the expansion sleeve, the expansion sleeve has a thin-wall design, for example. Alternatively or additionally, design measures can be provided in order to realize an advantageous expansion or advantageous expansion properties of the expansion sleeve. Moreover, it is contemplated to design the expansion sleeve in terms of its material so that an especially advantageous expansion or expansibility of the expansion sleeve can be realized. In this way, it is possible to equalize or compensate a possibly short clamping length of the screw by means of the expansion sleeve, so that an especially advantageous, firm and secure clamping of the components can be assured by means of the screw and by means of the expansion sleeve.

In the connection arrangement, the components are for example mechanically connected together and thus held against each other such that the components are clamped between the screw and the expansion sleeve. By the screwing of the screws into the expansion sleeve a clamping force is produced, by which the components are held against each other. The expansibility and thus the expansion behavior of the expansion sleeve make it possible to compensate for a setting behavior of the connection arrangement, so that even after a setting of the connection arrangement a firm and secure connection of the components can be assured. Owing to the use of the short screw and the long expandable expansion sleeve, which can also be called an expansion bushing, the screw will also not become loose due to setting or temperature changes.

It has proven to be especially advantageous for the second opening to be designed as a second passage opening, wherein the expansion sleeve passes through the second passage opening of the second component and protrudes into the first component and is expanded along its axial direction by screwing the screw into the expansion sleeve. Because the expansion sleeve in this embodiment not only protrudes into the second passage opening, but also passes through the second passage opening and moreover protrudes into the first component, especially the first passage opening, the length of the screw, especially the length of the shaft of the screw, can be kept especially short, so that the space requirement of the connection arrangement can be kept especially slight. Moreover, the expansion sleeve can be configured especially long and thus expandable.

In an advantageous embodiment of the invention, the expansion sleeve has a length which is received in the second opening and in the first component, that is, a length received in the components, especially in the passage openings, and which extends in the axial direction of the expansion sleeve, that is at least 1.5 times, especially at least 2 times and preferably at least 2.5 times as large as the clamping length of the screw. In this way, the length of the screw can be kept especially short, while at the same time an especially long length of the expansion sleeve, running in the axial direction of the expansion sleeve, can be realized. In this way, the space requirement of the connection arrangement can be kept especially slight, while at the same time ensuring a firm and secure connection of the components, since for example temperature fluctuations and/or a setting behavior of the connection arrangement can be compensated by the advantageous expansibility of the expansion sleeve resulting from the large length of the expansion sleeve. Preferably, the clamping length is at most ten millimeters, especially at most four millimeters.

Another embodiment is characterized in that the expansion sleeve has at least one hollow cross section which is bounded by a wall in the radial direction of the expansion sleeve. For example, the screw, especially its shaft, is received at least partly in the hollow cross section of the expansion sleeve. The wall has at least one passage opening. In particular, the wall has a plurality of passage openings. Such a passage opening is a particularly advantageous design option for realizing an especially advantageous expansibility and thus a strong expansion of the expansion sleeve resulting from the screwing of the screw into the expansion sleeve. In this way, it is possible to equalize a possibly only short clamping length of the screw by the expansion sleeve, so as to hold the components especially firmly and securely against one another for a long period of time.

In another embodiment of the invention it is provided that the components are designed as electrical conductors for the transmitting of electric current. The electrical conductors mechanically joined together by means of the screw and the expansion sleeve and thereby held against each other are electrically connected together, for example, that is, they make electrical contact with each other, so that electric energy or electric current can be transmitted from one of the electrical conductors to the other electrical conductor. The use of the screw and the expansion sleeve makes it possible to realize an advantageous antishock protection with only a small number of parts. By antishock protection is meant that the electrical conductors are protected against contact with a person, so that the likelihood of a person making contact with the electrical conductors can be kept especially low.

It has proven to be advantageous for the screw to be formed from an electrically conductive material, which touches the first component and is thereby in electrical contact with the first component. The electrical conductors are arranged in a current path along which electric energy or electric current can be transmitted and transmitted for example from a first component to a second component, for example the vehicle. Thanks to the electrical contacting of the screw with the first component, the screw is integrated in the current path, which can keep the space requirement of the connection arrangement especially low.

Moreover, it has proven to be particularly advantageous for the expansion sleeve to be formed from an electrically conductive material, which touches the second component and is thereby in electrical contact with the second component. Thus, alternatively or additionally to the screw, the expansion sleeve is integrated in the above described current path, so that the space requirement can be kept especially low. Thanks to the above described integration of the screw and the expansion sleeve in the current path, a clamping of the components occurs for example directly through the electrical conductors, the expansion sleeve and the screw, the clamping holding the components against each other, so that the number of parts, the space requirement, and the costs of the connection arrangement can be kept especially low.

In order to realize an especially good safety with only a slight number of parts and thus in a way favorable to costs and space requirement, it is provided in another embodiment of the invention that the screw and the first component are parts of a first connection apparatus comprising at least one first insulating element formed from an electrically insulating material. This means that the first connection apparatus comprises at least the screw, the first component, and the first insulating element. The first insulating element entirely encloses an outer side of the first component facing away from the screw in the radial direction of the screw, so that the outer side of the first component is entirely covered by the insulating element. Moreover, the first insulating element is situated at least partly between the screw and the first component in the radial direction of the screw. In this way, an especially advantageous antishock protection can be realized for the screw and for the first component in particular if the screw is separated or released from the expansion sleeve and the first component from the second component, thereby being physically apart from each other. In this way, the likelihood of a person making contact with the screw and with the first component can be kept especially low.

In order to realize an especially advantageous antishock protection in a way favorable to weight and space requirement, it has proven to be advantageous for the first insulating element to entirely cover a top side of the screw facing away from the first component in the axial direction of the screw.

Finally, another embodiment is characterized in that the expansion sleeve and the second component are parts of a second connection apparatus comprising at least one second insulating element formed from an electrically insulating material. Thus, the second connection apparatus comprises at least the expansion sleeve, the second component, and the second insulating element. The second insulating element entirely encloses an outer side of the second component facing away from the expansion sleeve in the radial direction of the expansion sleeve, so that the outer side of the second component is entirely covered by the second insulating element. In this way, the likelihood of a person touching the outer side of the second component can be kept especially low, so that an especially advantageous antishock protection can be provided. Moreover, in order to provide an especially advantageous antishock protection it is provided that the second insulating element is situated at least partly between the expansion sleeve and the second component in the radial direction of the expansion sleeve. In this way, an advantageous antishock protection can be realized for the second component and the expansion sleeve in particular if—as described above—the expansion sleeve is separated or released from the screw and thus the second component from the first component, thereby being physically apart from each other.

A second aspect of the invention relates to a connection device for the electrical connecting of two components, in particular of a vehicle, which is designed for example as a motor vehicle, especially a hybrid or electric vehicle. As already described for the first aspect of the invention, the second aspect of the invention can also be used for stationary applications. In particular, the second aspect of the invention is suitable for high-voltage applications having electrical voltages, especially operating voltages, of more than 60 Volts.

The connection device comprises a first component, which is designed as a first electrical conductor. Moreover, the connection device comprises a second electrical conductor as a second component of the connection device, which makes electrical contact with the first conductor. The electrical conductors are connected to each other by means of at least one screw element and at least one screw which is screwed into the screw element and passes through a first passage opening of the first conductor, thereby holding the conductors against one another. This means that the connection arrangement described in the context of the first aspect of the invention forms for example the connection device of the second aspect of the invention and vice versa, wherein the electrical conductors are mechanically joined together and thus held or fixed against each other by means of the screw and by means of the sleeve. Moreover, the electrical conductors are in electrical contact with each other and thus are electrically joined together, so that electric current or electric energy can be transmitted from one of the conductors to the other conductor. Thus, for example, electric current or electric energy can be transmitted from one of the components across the electrical conductor of the connection device to the other component.

Now, in order to be able to realize an especially firm and secure mechanical and thus electrical connection of the electrical conductors as well as a low space requirement of the connection device, it is provided according to the invention that the screw element is designed as an expansion sleeve which is partly received in a second opening of the second conductor and protrudes into the first conductor, especially into the first passage opening, particularly from the second opening. The expansion sleeve is expanded along its axial direction by screwing the screw into the expansion sleeve, that is, in the axial direction of the expansion sleeve, in particular it is elastically deformed. Benefits and advantageous embodiments of the first aspect of the invention are to be seen as benefits and advantageous embodiments of the second aspect of the invention and vice versa.

The components are preferably high-voltage (HV) components, each having an electrical voltage, especially an electrical operating voltage, of more than 30 Volts, especially more than 60 Volts. In particular, it can be provided that the respective high-voltage component has an electrical voltage, especially an electrical operating voltage, of more than 100 Volts, especially several 100 Volts. The connection device of the second aspect of the invention is thus used in order to electrically join together high-voltage components, especially of the vehicle. Here, the high-voltage components can be electrically connected together in an especially easy and fast manner, since the electrical conductors can be easily joined together by means of the screw and by means of the expansion sleeve, especially in a reversibly releasable manner. In particular, it may be provided that the screw is connected or can be connected to the expansion sleeve in a reversibly releasable manner. By a reversibly releasable connection or connectivity is meant that the screw and the expansion sleeve or the electrical conductors can be joined together and released from each other without damaging or destroying the screw or the expansion sleeve or the components (electrical conductors) in the process.

Owing to the above described antishock protection, for example, it is possible to protect the electrical conductors and the screw integrated in the current path, for example, or the expansion sleeve integrated in the current path for example, against unwanted contact with persons especially when the electrical conductors are not (yet) joined together and are physically spaced apart from each other, for example. In this way, the components or the electrical conductors can be electrically connected together and be released or separated from each other especially safely by a person.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic and sectioned exploded view of a connection device according to the invention for the electrical connecting of two components, especially of a vehicle.

FIG. 2 is a schematic sectioned view of a connection arrangement according to the invention of the vehicle, formed by the connection device, In the figures, the same or similar functioning elements are given the same reference number.

DETAILED DESCRIPTION OF THE DRAWINGS

FIG. 1 shows in a schematic and sectioned exploded view a connection device denoted by 1 as a whole for the electrical connecting of at least two components (not shown) in the figure, which in the present instance are components of a vehicle, designed for example as a motor vehicle, especially as a hybrid or electric vehicle. The following and the preceding remarks, however, are also applicable to stationary applications. The components are, for example, high-voltage (HV) components, having an electrical voltage, especially an electrical operating voltage, of more than 30 Volts, and especially more than 60 Volts. This means that the electrical components can operate or are operated with their respective electrical voltage of more than 30 Volts, especially more than 60 Volts, In particular, the respective electrical voltage of the respective component is several hundred volts. The components for example are part of a drive train for propelling the vehicle. One of the components is for example an energy accumulator designed as a high-voltage accumulator for the storing of electrical energy or electrical current. For example, the energy accumulator is designed as a battery, especially a high-voltage (HV) battery. The other component is, for example, an electrical machine which can be operated with electrical energy or electrical current stored in the energy accumulator. In this way, the electrical machine can be operated for example in a motor mode and thus as an electric motor, by means of which the vehicle can be propelled. In order to operate the electrical machine in its motor mode, electrical energy stored in the energy accumulator is transferred for example across the connection device 1 to the electrical machine.

The connection device 1 comprises a first connection apparatus 2 and a second connection apparatus 3, which are shown in FIG. 1 in a condition in which the connection apparatuses 2 and 3 are not connected together, that is, they are separated from each other or released from each other and thus physically apart from each other.

By connecting the connection apparatuses 2 and 3, the connection apparatuses 2 and 3 or the connection device 1 form a connection arrangement 4 as represented in FIG. 2. As can be seen from FIGS. 1 and 2, the first connection apparatus 2 comprises a first component 5 configured as the first electrical conductor and a screw 6. The second connection apparatus 3 comprises a second component 7 configured as the second electrical conductor and a screw element 8. In the connection arrangement 4, the first component 5 is arranged at least indirectly, in the present instance directly, on the second component 7, the components 5 and 7 being mechanically joined together by way of the screw element 8 and by way of the screw 6 screwed into the screw element 8. In this way, the components 5 and 7 are held or fixed against each other, while in the present case the components 5 and 7 are mechanically joined together in a reversibly detachable manner. Moreover, the components 5 and 7 are electrically contacting each other in the connection arrangement 4, that is, in a condition in which the connection apparatuses 2 and 3 are joined together, so that the components 5 and 7 are also electrically connected together. In this way, electric current or electric energy can be transferred from one of the components 5 and 7 to the respective other one of the components 5 and 7, so that for example the electric current stored in the energy accumulator can be transferred through the components 5 and 7 or through the connection device 1 to the electrical machine.

The connection apparatuses 2 and 3 are joined together such that the components 5 and 7 are arranged one on the other and the screw 6 is screwed into the screw element 8. In this way, the components 5 and 7 are electrically and mechanically joined together and thus held against one another. For this, the screw 6 has a shaft 9 which is also known as a screw shaft, a bolt, or a screw-bolt. The shaft 9 has an external thread 10. Moreover, the screw 6 has a screw head 11, comprising a flange 12. The first component 5 has a first passage opening 13, the shaft 9 penetrating through the passage opening 13 so that the screw head 11, especially the flange 12, is braced against the component 5 on a side facing away from the component 7, especially in a direct manner. The screw 6, especially by way of its flange 12, is braced against a bearing surface 27 of the component 5, especially in a direct manner. The bearing surface 27 is situated on the aforementioned side of the component 5 facing away from the component 7.

The screw element 8 has an internal thread 14 corresponding to the external thread 10, into which the external thread 10 can be screwed, so that the screw 6 can be screwed by the external thread 10 and the internal thread 14 into the screw element 8. The internal thread 14 is arranged in an opening of the screw element 8 configured in the present instance as a passage opening 16, the passage opening 16 being formed by a hollow cross section 17 of the screw element 8. The hollow cross section 17 is bounded here by a wall 18 of a shaft 19 of the screw element 8. Adjacent to the shaft 19 is a flange 20 of the screw element 8, the flange 20 being formed for example as a single piece with the shaft 19. The screw element 8, especially the flange 20, is braced, especially directly braced, against a side of the component 7 facing away from the component 5. Thus, if the screw 6 is screwed into the screw element 8 via the external thread 10 and the internal thread 14, and the components 5 and 7 are arranged between the flange 12 and the flange 20 in the axial direction of the screw 6 and the components 5 and 7 are braced, especially directly braced, against each other, the components are then clamped between the flange 12 and the flange 20. In this way, the components 5 and 7 are mechanically joined together and thus held against each other. In other words, by screwing the screw 6 into the screw element 8, a mechanical connection is formed, by means of which the components 5 and 7 are mechanically held against one another. Since, moreover, the components 5 and 7 are touching, the components 5 and 7 are also electrically joined together.

The components 5 and 7 are formed for example from an electrically conductive material, such as from a metallic material, such as copper. In the connection arrangement 4 illustrated in FIG. 2, the components 5 and 7 touch each other directly at respective end faces 21 and 22, so that the components 5 and 7 are electrically contacting each other, that is, electrically connected to each other.

Now, in order to realize an especially firm and secure connection of the components 5 and 7 and thereby keep the space requirement of the connection device 1 or the connection arrangement 4 especially low, the screw element 8 is configured as an expansion sleeve 23, which is received partly in a second opening of the component 7, fashioned as a second passage opening 24 of the component 7, and which in the process penetrates through the second passage opening 24 and protrudes into the first component 5.

It can be seen especially well from FIG. 1 that a seat 25 of the first component 5 is adjacent to the passage opening 13 in the axial direction of the screw 6, the seat 25 having a larger internal diameter than the passage opening 13 and being bounded in the radial direction of the screw 6 by a wall 26 of the component 5. Thus, for example, the passage opening 13 and the seat 25 fashioned as a passage opening, into which the passage opening 13 emerges, together form a third passage opening, into which the expansion sleeve 23 protrudes. Here, the screw 6, especially the shaft 9, passes through the passage opening 13, while the screw 6, especially the shaft 9, is at least partly received in the seat 25 and accordingly is covered at least partly by the wall 26 outwardly in the radial direction.

It can be seen especially well from FIG. 2 that the expansion sleeve 23, especially its shaft 19, not only protrudes into the passage opening 24, but also passes entirely through the passage opening 24 and protrudes into the first component 5, since the expansion sleeve 23, especially its shaft 19, is arranged partly in the seat 25 and accordingly is surrounded on the outside by the wall 26 in the radial direction. Thus, the shaft 9 is at least partly surrounded by the expansion sleeve 23 and by the wall 26 on the outside in the radial direction of the screw 6. In other words, in the radial direction of the screw 6 and thus in the radial direction of the expansion sleeve 23, the expansion sleeve 23 and especially its shaft 19 is arranged in the seat 25 at least partly between the shaft 9 of the screw 6 and the wall 26 of the component 5.

In order to screw the screw 6, especially its external thread 10, into the expansion sleeve 23, especially into the internal thread 14, the passage openings 13 and 16 are arranged at least partly in mutual congruence or overlapping. Thus, the axial direction of the screw 6 coincides with the axial direction of the expansion sleeve 23, while also the radial direction of the screw 6 coincides with the radial direction of the expansion sleeve 23. Moreover, the direction of longitudinal extension of the screw 6 coincides with the axial direction, and the direction of longitudinal extension of the expansion sleeve 23 coincides with its axial direction. In the present instance, the screw 6 and the expansion sleeve 23, especially its thread, are arranged coaxially to each other.

Furthermore, it is provided in the connection arrangement 4 or in the connection device 1 in its produced state that the expansion sleeve 23, especially its shaft 19, is expanded along its axial direction, especially elastically expanded or deformed, by the screwing of the screw 6 into the expansion sleeve 23. The screwing of the screw 6 into the expansion sleeve 23 generates a clamping force by means of which the components 5 and 7 are clamped between the flange 12 and the flange 20 and thus held against each other.

Because the expansion sleeve 23 protrudes into the component 5, the expansion sleeve 23 and especially its internal thread 14 can be arranged especially close to the screw head 11 in terms of the axial direction of the screw 6. In this way, the clamping length of the screw 6, denoted as L in FIG. 2, can be kept especially small, so that the space requirement can be kept especially low. Moreover, it is possible to design the expansion sleeve 23, especially the shaft 19, especially large in terms of its length running in the axial direction of the expansion sleeve 23, so that an especially advantageous expansibility of the expansion sleeve 23 can be realized. This can compensate for the only slight clamping length L, so that a firm and secure connection of the components 5 and 7 can be produced.

The connection device 1 is a so-called current connector, by means of which the components can be electrically connected. Owing to the use of the expandable expansion sleeve 23, also termed a bushing, and the merely short screw 6, the current connector can be designed very compact in its dimensions, allowing the advantageous properties to be implemented for a standard screw connection. For example, in order to compensate for the increased setting behavior of the electrical conductors, which are formed at least for the most part of copper with a surface coating, for example, the expansion behavior of the expansion sleeve 23 can be specially designed and optimized for the particular application, with costs optimized at the same time, while the number of parts of the connection arrangement 4 or the connection device 1 can be kept especially low.

In the sample embodiment illustrated in FIGS. 1 and 2, the expansion sleeve 23, especially its shaft 19, has a length 1 which is received in the second passage opening 24 and in the first component 5 or in the seat 25 and which extends in the axial direction of the expansion sleeve 23, being thus received in the axial direction of the expansion sleeve 23 in the components 5 and 7, while this length 1 is at least 2.5 times as large as the clamping length L of the screw 6. By the clamping length L is meant the distance, extending in the axial direction of the screw 6, between the bearing surface 27 and the internal thread 14, especially the beginning of the internal thread 14.

The aforementioned hollow cross section 17 is bounded in the radial direction of the expansion sleeve 23 here by the wall 18. As is illustrated especially schematically in FIG. 2, the wall 18 may have at least one passage opening 28. The passage opening 28 is formed for example as a borehole. The passage opening 28 is a design measure by which especially advantageous expansion properties and thus an especially advantageous expansibility of the expansion sleeve 23, especially its shaft 19, can be realized.

In order for a single person to mount or produce the connection device 1 in an especially simple and especially safe manner, as well as dismount or release it, the connection apparatus 2 comprises at least one first insulating element 29, which in the present case comprises two insulating parts 30 and 31 formed separately from each other. The insulating parts 30 and 31 are each formed of an electrically insulating material and thus are designed as electrical insulators. Furthermore, the connection apparatus 3 comprises at least one second insulating element 32, which is formed from an electrically insulating material.

The insulating element 29, especially the insulating part 30, encloses entirely an outer side 33 of the first component 5 facing away from the screw 6 in the radial direction of the screw 6, so that the outer side 33 is covered entirely by the insulating part 30. In this way, a person for example cannot come into contact with the outer side 33. Furthermore, the insulating element 29, especially the insulating part 30, is at least partly arranged in the seat 25 and thus arranged in the radial direction of the screw 6 between the screw 6, especially between the shaft 9 and the component 5, especially the wall 26. Furthermore, the insulating element 29, especially the insulating part 30, extends beyond both the screw 6 and the component 5 in the axial direction at both ends, that is, both on the sides with the shaft 9 and on the sides with the screw head 11.

The insulating part 31 is a cap, also called a protective cap. Here, the insulating element 29, especially the insulating part 31, entirely covers a top side 34 of the screw 6 facing away from the component 5 in the axial direction of the screw 6, while in the present case a top side 35 of the component 5 facing away from the component 7 in the axial direction of the screw 6 is also entirely covered by the insulating part 31 or the insulating element 29. In this way, the likelihood of a contact between the person and the screw 6, or the component 5, can be kept especially low.

In the present instance, the screw 6 is formed from an electrically conductive material and touches the component 5, so that the screw 6 is electrically connected to or contacting the component 5. In this way, the space requirement of the connection arrangement 4 or the connection device 1 can be kept especially low.

The insulating element 32 entirely surrounds an outer side 36 of the component 7 facing away from the expansion sleeve 23 in the radial direction of the expansion sleeve 23, so that the outer side 36 is entirely covered by the insulating element 32. Moreover, the insulating element 32 is at least partly arranged in the passage opening 24, so that the insulating element 32 is arranged in the radial direction of the expansion sleeve 23 between the expansion sleeve 23 and the component 7. Moreover, the insulating element 32 extends beyond the component 7 in the axial direction of the expansion sleeve 23 at both ends, so that the danger of contact between a person and the component 7 can be kept especially low.

Due to the use of the insulating elements 29 and 32, an especially advantageous antishock protection can be realized, so that especially when the connection apparatuses 2 and 3 are not joined together, but rather separate from each other and thus physically spaced apart from each other, the likelihood of a contact between a person and electrically conductive components of the connection device 1 can be kept especially low.

Usually a sufficient clamping length of the screw 6 is necessary so that the screw 6 cannot become loosened by setting and temperature changes. Usually the clamping length during the screwing in of the screw 6 results in an elastic expansion of the unscrewed screw shaft and thus acts as a very rigid spring element and can compensate for the setting of the connection arrangement, that is, a slight reduction in thickness of the screwed-together components 5 and 7. Moreover, usually a large number of electrically insulating parts is required, which are specially made, in order to realize an antishock protection. Such a part is formed, for example of a plastic composite material. Usually these electrically insulating parts are present in a clamping path by which the above described clamping force is transmitted for the connecting of the components 5 and 7. The arrangement of electrically insulating parts in the clamping path usually results in strong setting and thus negatively influences the connecting of the components 5 and 7.

In the connection arrangement 4 or in the connection device 1, the aforementioned problems and detriments are avoided, since the length of the screw 6, especially that of the shaft 9, running in the axial direction of the screw 6 can be kept especially short. In this way, an especially effective antishock protection can be realized with only a slight number of parts and thus in a way favorable to costs, weight, and space requirement. Thus, the screw 6 cannot be touched, even in the opened or released state of the connection device 1.

However, too short a length of the screw 6 may mean that a sufficient clamping length of the screw 6 is no longer available. In order to assure an especially secure and firm connection of the components 5 and 7 when using the very short screw 6, the expandable expansion sleeve 23 will be used, by means of which an especially advantageous expansion can be achieved. In order to be able to realize in this case an especially advantageous expansion or advantageous expansion properties of the expansion sleeve 23, the expansion sleeve 23 is designed with an especially thin wall, for example. Thanks to this advantageous expansion of the expansion sleeve 23, the only slight clamping length L of the screw 6 can be compensated, so that an especially firm and long-lasting holding together of the components 5 and 7 can be assured.

LIST OF REFERENCE NUMBERS 1 connection device
2 connection apparatus
3 connection apparatus
4 connection arrangement
5 first component
6 screw
7 second component
8 screw element
9 shaft
10 external thread
11 screw head
12 flange
13 passage opening
14 internal thread
16 passage opening
17 hollow cross section
18 wall
19 shaft
20 flange
21 contact surface
22 contact surface
23 expansion sleeve
24 passage opening
25 seat
26 wall
27 bearing surface
28 passage opening
29 insulating element
30 insulating part
31 insulating part
32 insulating element
33 outer side
34 top side
35 top side
36 outer side
1 length
L clamping length The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection arrangement for a vehicle, comprising:
   a first component;
   a second component on which the first component is arranged;
   at least one screw element with an opening and an internal thread arranged in the opening wherein the internal thread extends along the opening of the at least one screw element; and
   at least one screw with a shaft and an external thread disposed on the shaft wherein the external thread extends along the shaft of the at least one screw;
   wherein the first and second components are connected together by the at least one screw element with the internal thread and the at least one screw with the external thread which is screwed into the internal thread of the screw element and passes through a first passage opening of the first component,
   wherein the screw element is an expansion sleeve which is partly received in a second opening of the second component and protrudes into the first component and which is expanded along the axial direction of the sleeve by screwing the screw into the expansion sleeve;
   wherein the first and second components are electrical conductors for transmitting electric current;

wherein the screw is formed from an electrically conductive material, which touches the first component and is thereby in electrical contact with the first component.

2. The connection arrangement as claimed in claim 1, wherein
the second opening is a second passage opening, wherein the expansion sleeve passes through the second passage opening of the second component and protrudes into the first component and is expanded along the axial direction by screwing the screw into the expansion sleeve.

3. The connection arrangement as claimed in claim 1, wherein
the expansion sleeve has a length (I) which is received in the second opening and in the first component and which extends in the axial direction of the expansion sleeve, which length (I) is at least 1.5 times as large as a clamping length of the screw.

4. The connection arrangement as claimed in claim 3, wherein
the length (I) is at least 2 times as large as a clamping length of the screw.

5. The connection arrangement as claimed in claim 3, wherein
the length (I) is at least 2.5 times as large as a clamping length of the screw.

6. The connection arrangement as claimed in claim 1, wherein
the expansion sleeve has at least one hollow cross section which is bounded by a wall in the radial direction of the expansion sleeve, having at least one passage opening.

7. The connection arrangement as claimed in claim 1, wherein
the expansion sleeve is formed from an electrically conductive material, which touches the second component and is thereby in electrical contact with the second component.

8. A connection arrangement for a vehicle, comprising:
a first component;
a second component on which the first component is arranged;
at least one screw element with an opening and an internal thread arranged in the opening wherein the internal thread extends along the opening of the at least one screw element; and
at least one screw with a shaft and an external thread disposed on the shaft wherein the external thread extends along the shaft of the at least one screw;
wherein the first and second components are connected together by the at least one screw element with the internal thread and the at least one screw with the external thread which is screwed into the internal thread of the screw element and passes through a first passage opening of the first component,
wherein the screw element is an expansion sleeve which is partly received in a second opening of the second component and protrudes into the first component and which is expanded along the axial direction of the sleeve by screwing the screw into the expansion sleeve;
wherein the first and second components are electrical conductors for transmitting electric current;
wherein the screw and the first component are parts of a first connection apparatus comprising at least one first insulating element formed from an electrically insulating material, which entirely encloses an outer side of the first component facing away from the screw in the radial direction of the screw and situated at least partly between the screw and the first component in the radial direction of the screw.

9. The connection arrangement as claimed in claim 8, wherein
the first insulating element entirely covers a top side of the screw facing away from the first component in the axial direction of the screw.

10. The connection arrangement as claimed in claim 8, wherein
the expansion sleeve and the second component are parts of a second connection apparatus comprising at least one second insulating element formed from an electrically insulating material, which entirely encloses an outer side of the second component facing away from the expansion sleeve in the radial direction of the expansion sleeve and situated at least partly between the expansion sleeve and the second component in the radial direction of the expansion sleeve.

11. A connection arrangement for a vehicle, comprising:
a first component;
a second component on which the first component is arranged;
at least one screw element with an opening and an internal thread arranged in the opening wherein the internal thread extends along the opening of the at least one screw element; and
at least one screw with a shaft and an external thread disposed on the shaft wherein the external thread extends along the shaft of the at least one screw;
wherein the first and second components are connected together by the at least one screw element with the internal thread and the at least one screw with the external thread which is screwed into the internal thread of the screw element and passes through a first passage opening of the first component,
wherein the screw element is an expansion sleeve which is partly received in a second opening of the second component and protrudes into the first component and which is expanded along the axial direction of the sleeve by screwing the screw into the expansion sleeve;
wherein the first and second components are electrical conductors for transmitting electric current;
wherein the expansion sleeve and the second component are parts of a second connection apparatus comprising at least one second insulating element formed from an electrically insulating material, which entirely encloses an outer side of the second component facing away from the expansion sleeve in the radial direction of the expansion sleeve and situated at least partly between the expansion sleeve and the second component in the radial direction of the expansion sleeve.

* * * * *